No. 656,491.  
W. W. VALENTINE.  
AUTOMOBILE VEHICLE.  
(Application filed Mar. 9, 1900.)

Patented Aug. 21, 1900.

(No Model.)

5 Sheets—Sheet 1.

WITNESSES:  
Henry Krug  
Russell M. Everett

INVENTOR  
Waldo W. Valentine,  
BY Drake  
ATTORNEYS

No. 656,491. Patented Aug. 21, 1900.
W. W. VALENTINE.
AUTOMOBILE VEHICLE.
(Application filed Mar. 9, 1900.)

(No Model.) 5 Sheets—Sheet 2.

WITNESSES: Henry Krug, Russell M. Everett.

INVENTOR
Waldo W. Valentine,
BY Drake & Co.
ATTORNEYS

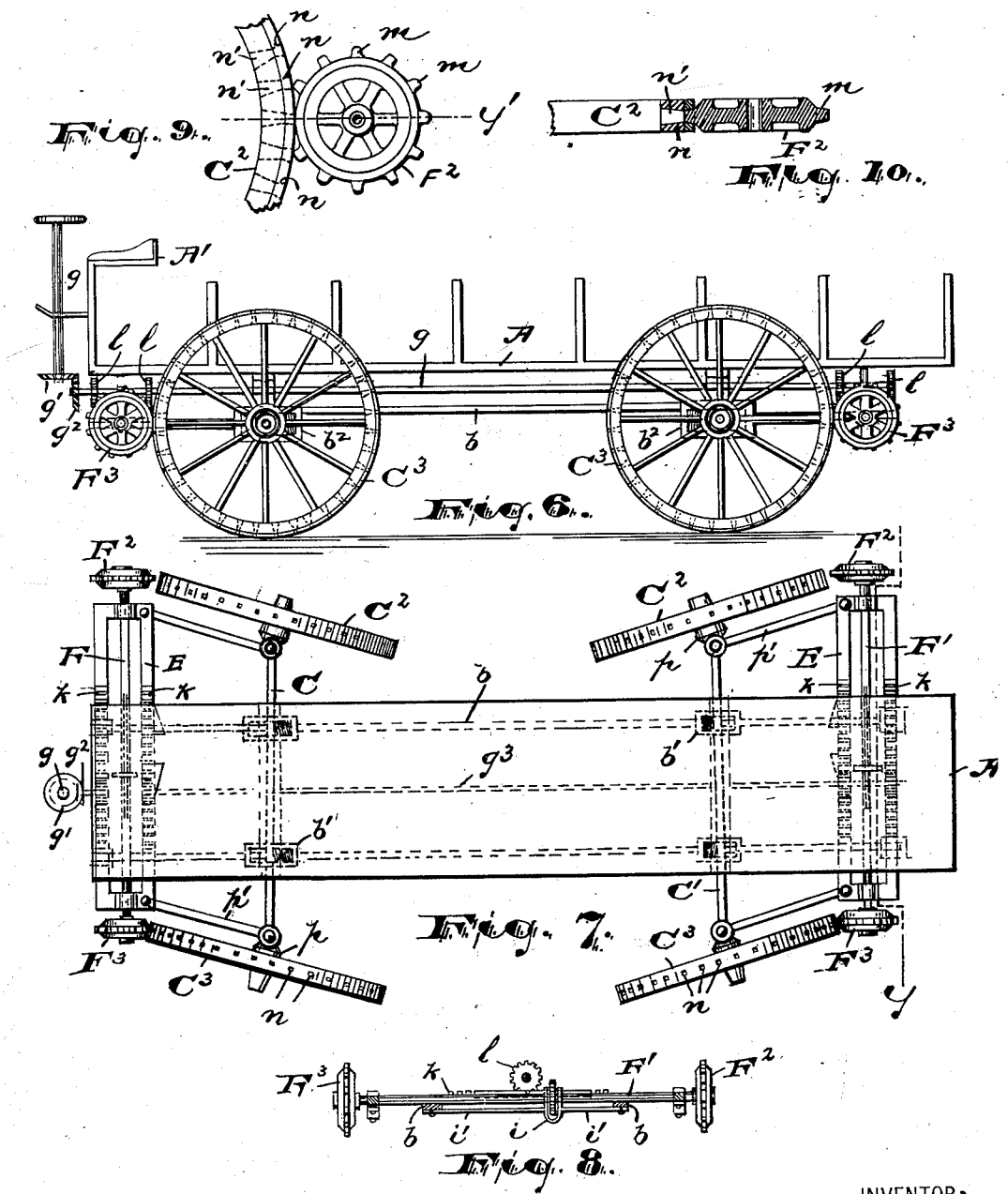

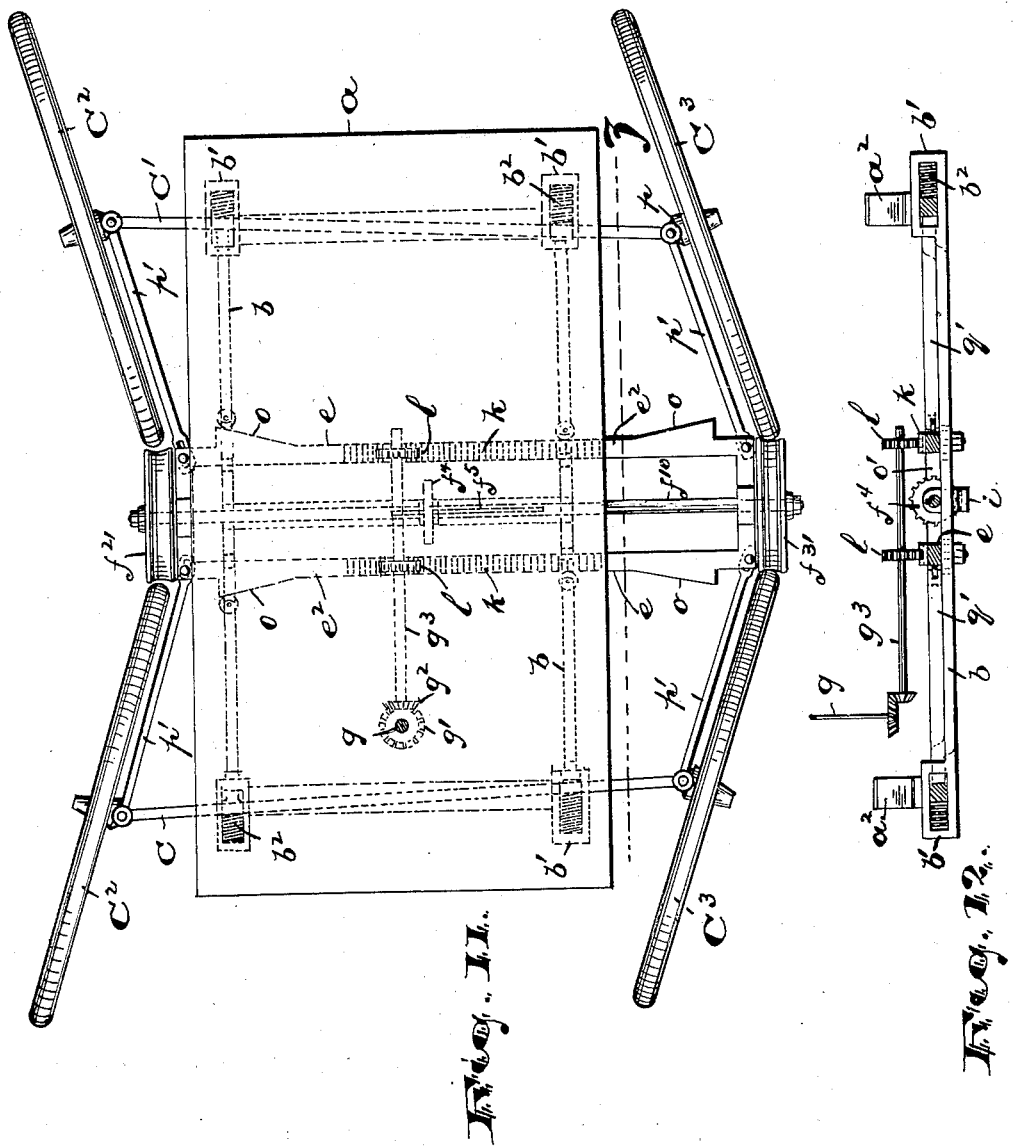

No. 656,491. Patented Aug. 21, 1900.
W. W. VALENTINE.
AUTOMOBILE VEHICLE.
(Application filed Mar. 9, 1900.)
(No Model.) 5 Sheets—Sheet 5.
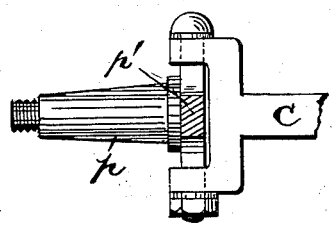
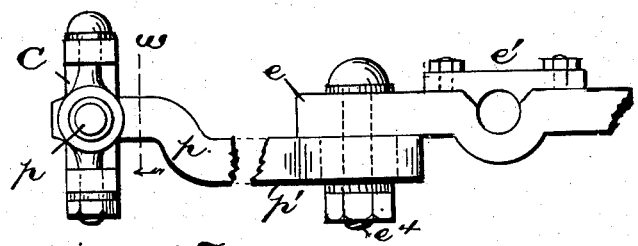
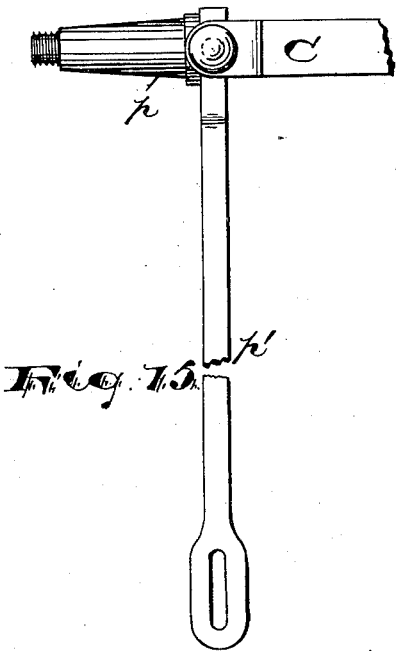
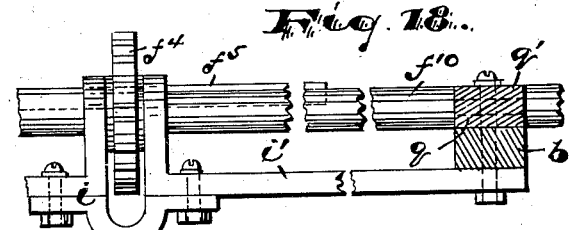
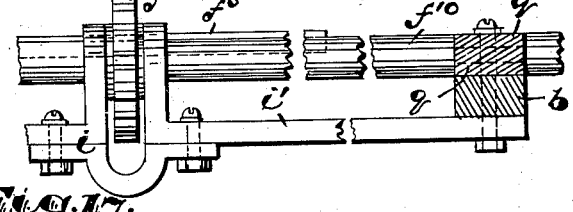
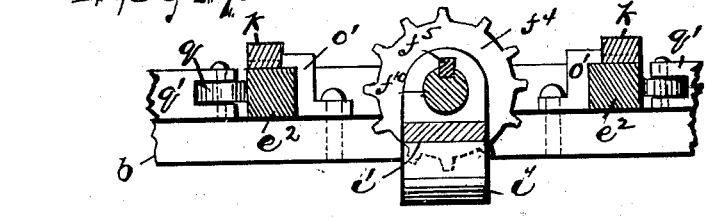
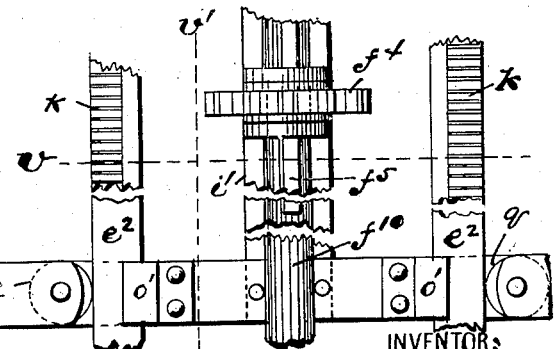
WITNESSES: Henry Krug, Russell M. Everett.
INVENTOR: Waldo W. Valentine,
BY Drake & Co.
ATTORNEYS

UNITED STATES PATENT OFFICE.

WALDO W. VALENTINE, OF NEW YORK, N. Y.

AUTOMOBILE VEHICLE.

SPECIFICATION forming part of Letters Patent No. 656,491, dated August 21, 1900.

Application filed March 9, 1900. Serial No. 7,951. (No model.)

*To all whom it may concern:*

Be it known that I, WALDO W. VALENTINE, a citizen of the United States, residing at New York, borough of Manhattan, State of New York, have invented certain new and useful Improvements in Automobile Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of automobile vehicles shown in my previous application for patent, filed May 1, 1899, Serial No. 715,086, and allowed November 6, 1899, the objects of the present invention being to secure a construction by which an open space is provided between the adjacent peripheries of the front and rear wheels on the same side of the vehicle, to provide means when the vehicle is rounding a curve for throwing the running wheels on the inner side of the curve out of engagement with the driving-wheels, to obtain an improved construction of steering-gear, to provide means for removing any adhering mud or the like from the peripheries of the running wheels as they revolve, so that a clean contact-surface shall be presented to the driving-wheel, and to secure other advantages and results, some of which may be hereinafter referred to in connection with the description of the working parts.

The invention consists in the improved automobile vehicle herein described and in the arrangements and combinations of parts of the same, all substantially as will be hereinafter set forth, and finally embraced in the clauses of the claim.

Figure 1:
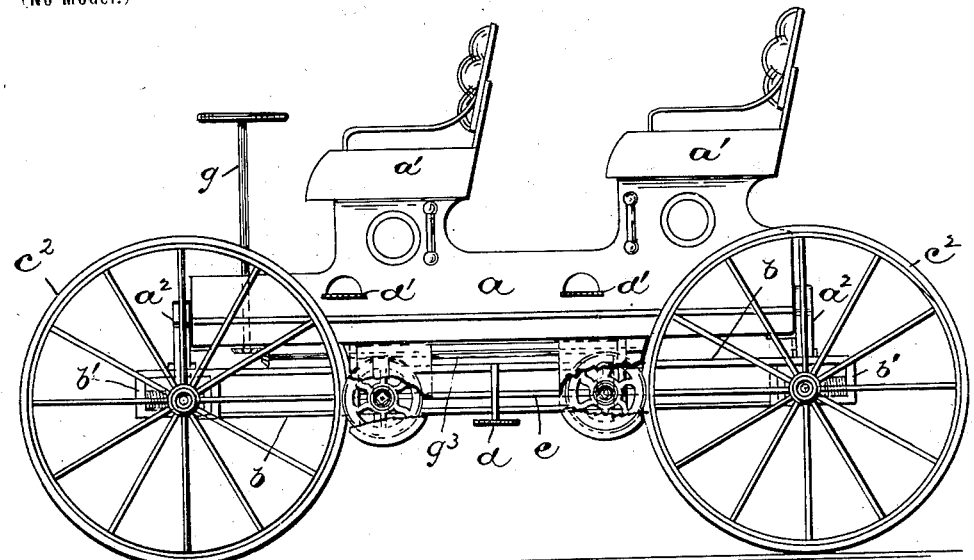
Figure 2:
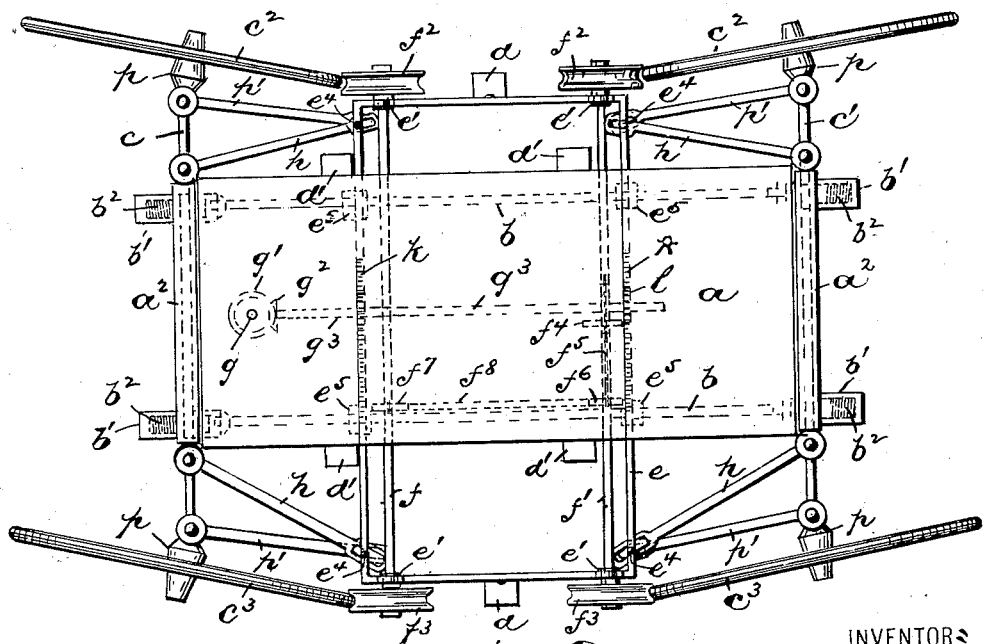
Figure 3:
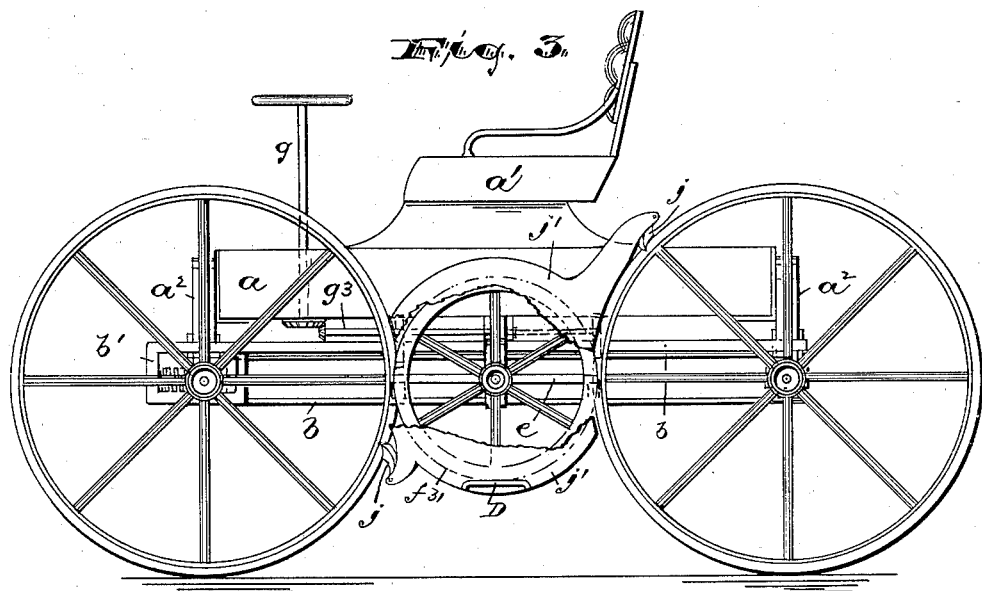
Figure 5:
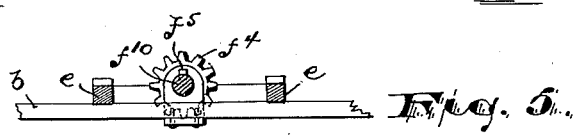
Figure 4:
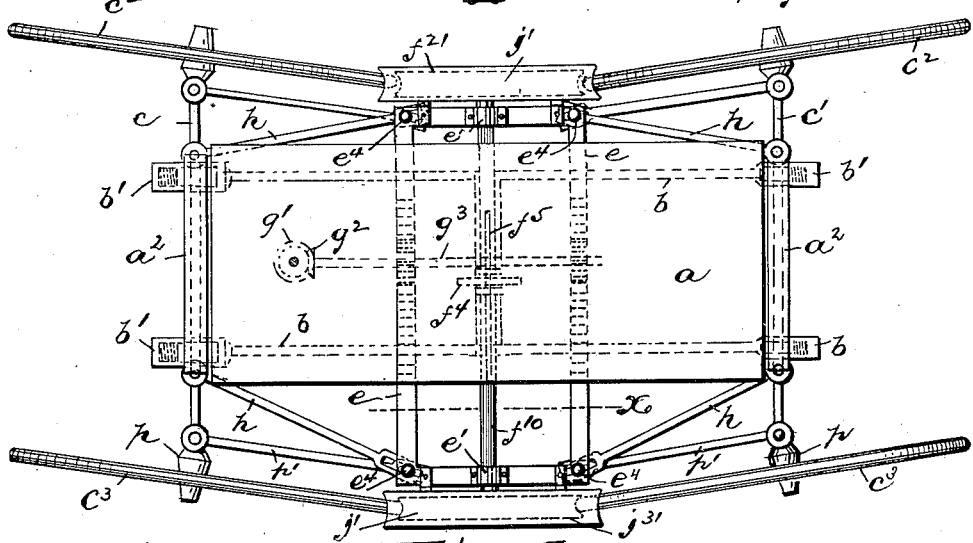

Referring to the accompanying drawings, in which like letters of reference indicate corresponding parts in each of the several views, Figure 1 is a side elevation of a vehicle having separate driving-wheels for the front and rear running wheels, said driving-wheels being intermediate of the running wheels and providing between themselves access to the body of the vehicle. Fig. 2 is a plan of the same. Fig. 3 is a side elevation of a vehicle having a single driving-wheel at each side and showing the application of mud-scrapers. Fig. 4 is a plan exhibiting the application to a single-driving-wheel vehicle of levers for throwing the running wheels at the inner side of a curve out of contact with the driving-wheel. Fig. 5 is a sectional view on line $x$, Fig. 4. Figs. 6 and 7 are respectively a side elevation and a plan of a construction sometimes applied to trucks or heavy vehicles. Fig. 8 is a sectional view on line $y$, Fig. 7. Fig. 9 is a side view, on a larger scale, of a portion of a running wheel and driving-wheel in engagement; and Fig. 10 is a section of the same on line $y'$. Fig. 11 is a plan of a vehicle, showing a modification of construction for throwing the wheels on the inner side of a curve out of contact with the driving-wheel; and Fig. 12 is a section of the same, minus the body and wheels, on line $z$, Fig. 11. Fig. 13 is a view from the side of the carriage of the driving-wheel-carrying frame and running-wheel-controlling lever operated thereby, both the said driving-wheel and running wheel being removed. Fig. 14 is a section on line $w$, Fig. 13. Fig. 15 is a plan of the running-wheel-controlling lever. Fig. 16 is a detail plan view of a central portion of the driving-wheel shaft and its frame, as shown in Fig. 11; and Figs. 17 and 18 are sections of the same on lines $v$ and $v'$, respectively, Fig. 16.

In said drawings, $a$ indicates the body of an automobile vehicle of my improved construction, said body being provided with seats $a'$ and also carrying power-generating means of any suitable kind, said means not being shown, as none of the features of my invention reside therein. The said body is supported by springs $a^2$ upon a horizontal framework $b$, resting at its opposite ends upon the front and rear axles $c$ and $c'$, said axles having at their outer ends the hinged sections $p$ (shown in my previous application above referred to) and rigid steering-levers $p'$, extending from said hinged sections to the sliding frame which carries the driving shaft or shafts. Running wheels $c^2$ $c^3$ are pivoted at the opposite ends of the axles, and, as in the said prior application, the frame $b$ provides slideways $b'$, in which said axles have a limited movement in the direction of the length of the vehicle, springs $b^2$ normally pressing said axles toward the transverse driving shaft or shafts.

In my previous application I have shown a single transverse driving-shaft carrying at its opposite ends driving-wheels frictionally engaging at their peripheries the peripheries of the running wheels, as is also shown in Figs. 3 and 4 of the present case. This construction has, however, been found to in some degree obstruct access to the vehicle, especially where the body of the vehicle is of considerable length, and I have therefore in the present invention provided a construction affording an open space at the middle of each side of the vehicle between the front and rear wheels and presenting free access, by means of steps $d$ $d'$, to the seats, especial reference being had to Figs. 1 and 2 of the drawings. Here $e$ indicates a rigid frame horizontally disposed and adapted to slide transversely upon the framework $b$ of the vehicle. The said sliding frame provides bearings $e'$, preferably at its opposite sides, for front and rear transverse driving-shafts $f$ $f'$, each of said shafts being arranged near to the corresponding end of the frame $e$. At the outer ends of the said driving-shafts are driving-wheels $f^2$ $f^3$, adapted to engage at their concaved peripheries the convex peripheries of the running wheels and impart motion thereto as the driving-shafts are rotated. For rotating said driving-shafts one of them is provided with a pulley $f^4$, adapted to receive power from the motor in any ordinary manner and being keyed to the shaft upon a long feather or spline $f^5$, which permits independent lateral sliding of the frame $e$, as hereinafter described. The second driving-shaft preferably receives its power from the first by means of pulleys $f^6$ $f^7$ on the respective shafts and a connecting belt or chain $f^8$. In steering the vehicle the frame $e$ is slid horizontally to one side or the other, the front and rear end bars of the frame being provided for this purpose with racks $k$, engaged by pinions $l$ upon a longitudinal steering-shaft $g^3$, said steering-shaft being operated by means of the bevel-gears $g'$ $g^2$ and an upright lever $g$, convenient to the hand of the driver. The frame $e$, carrying the driving-shafts, is substantially equal in length to the space between the front and rear wheels of the vehicle, and the controlling-levers $p'$ of the running wheels are slotted at their ends and receive pins $e^4$ on the ends of the frame $e$, whereby as the frame is slid transversely the vehicle is steered, and at the same time the driving-wheels are kept in alinement with the running wheels. As the frame $e$ slides from side to side in its bearings $e^5$ the power-pulley $f^4$ retains its position unchanged, being held by a suitable retaining-fork $i$, supported by arms $i'$, fastened to the framework of the vehicle. The spline $f^5$ upon the driving-shaft then permits said shaft to be carried from side to side by the frame $e$ without interrupting transmission of power to the shaft.

A second feature of the present invention and which is also shown in Figs. 1 and 2 just described, consists in throwing the running wheels at the inner side of a curve when the vehicle is turning out of contact with the driving-wheels, whereby said inner wheels are permitted to turn at the slower rate demanded by the inner side of a curve without slipping on the driving-wheels. To effect this object, I may provide spreading-levers $h$, pivoted to the axles at points close to the body of the vehicle and extending obliquely outward from said body to the pins $e^4$, near the outer sides of the frame $e$. The ends of the levers are slotted to receive said pins, the bottom of this slot lying close to the pin when the wheels of the vehicle are in normal position parallel to the body. As soon as the frame $e$, however, is slid to one side—say to the left—the pin engages the bottom of the slot on the right side of the vehicle and the axles are pushed apart from one another against the power of the springs $b^2$. This toggle-joint action automatically produced by the steering operations thus serves to throw the rims of the running wheels out of engagement with the driving-wheels at one side of the vehicle. At the other side, however, the elongated slot in the end of the lever permits movement without any action upon the lever, and the wheels consequently remain in engagement to propel the vehicle around the curve. In Figs. 3 and 4 I have shown this construction of spreading-levers applied to a vehicle having only a single driving-shaft $f^{10}$, the other parts conforming to the above description of Figs. 1 and 2. In Fig. 3 I have also shown scrapers $j$, arranged to clean the peripheries of the running wheels after they leave the ground and before they come into engagement with the driving-wheels. These scrapers may be of any suitable form to accomplish their purpose and are preferably supported upon the guard or shield $j'$, covering the driving-wheel.

In Figs. 6 and 7 I have shown my invention as applied to a truck or heavy wagon and with the driving-wheels $F^2$ $F^3$ and shafts F F' disposed at the extreme front and rear ends of the vehicle outside of the running wheels $C^2$ $C^3$. In this case it is necessary to provide each driving-shaft with an independent frame E; but said frames are moved simultaneously by means of racks $k$, engaged by similar pinions $l$ on the steering-shaft $g^3$. I have also shown in these figures, as being especially applicable to trucks and heavy vehicles, the peripheral engagement of driving-wheels and running wheels by means of pins $m$ and perforations $n$, as referred to in my previous application. In this construction the driving-wheel has a peripheral series of radially-projecting pins or studs $m$, and these are adapted to enter corresponding perforations $n$ in the tire of the wheel. These perforations $n$ are preferably somewhat flaring outwardly to more readily receive the pins $m$, and to prevent dirt accumulating in and clogging said perforations the perforations are carried through the fellies of the wheel and widened inwardly, as at $n'$, so that no dirt or the like can find lodgment.

In Fig. 11 I have shown a preferred modification of construction for effecting a spreading of the front and rear axles at the inner side of a curve. Here the side pieces $e^2$ of the sliding frame $e$ are provided at their outer sides with inclined planes $o$, having their widest ends toward the sides of the vehicle. The bearings of the sliding frame upon the reaches $b$ of the vehicle comprise stationary brackets $o'$ at the inner sides of the side pieces $e^2$ and at the outer sides friction-wheels $q$, each pivoted in the end of a lever $q'$, which bears at its opposite end against the axle. When, therefore, the sliding frame $e$ is slid transversely in turning a curve, the inclined planes $o$ engage the friction-wheels $q$ and push the levers $q'$ longitudinally apart, said levers transmitting the movement to the axles, which are thus pushed apart against the power of the springs $b^2$. The inclined planes are so placed, it will be understood, upon the side pieces $e^2$ of the frame $e$ that the spreading of the axles occurs when a proper degree of deflection of the wheel has been produced.

Various minor changes and modifications of details may be made in my invention without departing from its spirit and scope, and I do not wish to be understood as limiting myself by any of the descriptive terms employed, excepting as the state of the art may require.

Having thus described the invention, what I claim as new is--

1. In an automobile vehicle, the combination with front and rear axles having hinged end sections and running wheels pivoted thereon, of a transversely-slidable frame between said front and rear axles, driving-shafts having bearings on said frame, driving-wheels upon said shafts and engaging the running wheels, means for rotating said shafts and means for sliding the said frame, substantially as set forth.

2. In an automobile vehicle, the combination with an axle and running wheels pivoted thereon, of a sliding frame arranged parallel to the axle, means for sliding said frame in the direction of the length of the axle, a driving-shaft having bearings on said frame and carrying driving-wheels engaging the running wheels to transmit motion thereto, and means for rotating said shaft, substantially as set forth.

3. In an automobile vehicle, the combination with a transverse axle, and running wheels pivoted thereon, of a transversely-sliding frame, a driving-shaft having bearings in said frame, and driving-wheels on said shaft engaging the running wheels, substantially as set forth.

4. In an automobile vehicle, the combination with a transverse axle having pivoted end sections and running wheels thereon, of a transversely-sliding frame adjacent to said axle, a driving-shaft having bearings on said frame and carrying driving-wheels engaging the running wheels, and steering-levers extending from the said pivoted end sections of the axles to the said sliding frame, substantially as set forth.

5. In an automobile vehicle, the combination with a transverse axle having pivotal end sections and running wheels thereon, of a transversely-sliding frame, a driving-shaft having bearings on said frame, driving-wheels upon said shaft and engaging the running wheels to transmit motion thereto, steering-levers rigidly connected to said pivotal end sections of the axles and pivotally connected to the sliding frame, and springs pressing said axle toward the sliding frame, substantially as set forth.

6. In an automobile vehicle, the combination with the framework, of a transversely-sliding frame having bearings thereon, a rotary shaft journaled on said frame, driving-wheels fast on said shaft and engaging the running wheels of the vehicle, a power-pulley keyed to said rotary shaft upon a long spline permitting longitudinal movement of the shaft independent of the pulley, a forked stay holding said pulley in place, and means for sliding the frame, substantially as set forth.

7. In an automobile vehicle, the combination with a transverse axle and running wheels thereon, of a transversely-sliding frame, a driving-shaft journaled upon said frame and having driving-wheels transmitting motion to said running wheels, and means for forcing the axle away from the frame as said frame is slid transversely, substantially as set forth.

8. In an automobile vehicle, the combination with a transverse axle and running wheels thereon, of a transversely-sliding frame, a driving-shaft journaled on said frame and having driving-wheels transmitting motion to said running wheels, and levers extending from said sliding frame to the axle and being operated by the sliding frame to push the axle away from the frame and carry the running wheels and driving-wheels out of engagement, substantially as set forth.

9. In an automobile vehicle, the combination with a transverse axle having pivotal end sections and running wheels thereon, of a transversely-sliding frame carrying a driving-shaft and driving-wheels transmitting motion to said running wheels, steering-levers extending from said pivotal end sections of the axles to the sliding frame and spreading means whereby as the sliding frame is operated to steer the vehicle the axle is forced away from the frame at the side of the vehicle toward which the turn is being made, substantially as set forth.

10. In an automobile vehicle, the combination with a transverse axle and running wheels thereon, of a transversely-sliding frame carrying a driving-shaft with driving-wheels thereon adapted to engage the running wheels, a spreading-lever extending from the axle to a point near the frame, and said frame being provided at its adjacent side with a projecting surface adapted to engage and operate said lever as the frame is slid, substantially as set forth.

11. In an automobile vehicle, the combination with a transverse axle and running wheels thereon, of a transversely-sliding frame, a driving-shaft upon said frame and driving-wheels normally engaging said running wheels, spreading-levers extending from said axle to said frame, and beveled projections near the opposite ends of said frame, one of which is adapted to engage a spreading-lever as the frame is slid in the direction of the other beveled surface, substantially as set forth.

12. In an automobile vehicle, the combination with front and rear axles and springs pressing said axles toward one another, of an intermediate sliding frame carrying a driving-shaft and driving-wheels, said frame being wider at its opposite ends than at the middle parts, and spreading-levers extending from said axles toward the said sliding frame, and adapted to be engaged and forced apart by the said wider ends as the frame is slid, substantially as set forth.

13. In an automobile vehicle, the combination of the running wheels, the driving-shaft, driving-wheels upon said shaft engaging the peripheries of the running wheels, a frame supporting said driving-shaft and being adapted to slide transversely and provided with rack-teeth, a steering-shaft having fixed bearings, pinions upon said steering-shaft engaging said rack-teeth, and means for rotating said steering-shaft, substantially as set forth.

14. In an automobile vehicle, the combination of transversely-slidable frames each carrying a driving-shaft and driving-wheels thereon engaging the peripheries of running wheels of the vehicle, a longitudinal steering-shaft having fixed bearings on the vehicle, pinions upon said shaft and racks upon the sliding frames, said racks being engaged by said pinions as the steering-shaft is turned, whereby the frames are all moved simultaneously, and an upright hand-shaft and co-operating bevel-gears for turning the steering-shaft, substantially as set forth.

15. In an automobile vehicle, the combination with running wheels having their rims radially perforated and said perforations flaring from the middle toward each end, of driving-wheels adapted to peripherally engage said running wheels and having radially-projecting pins adapted to enter the perforations in the running wheels, and means for driving said driving-wheels, substantially as set forth.

16. In an automobile vehicle, the combination of running wheels, a transversely-sliding frame, a driving-shaft journaled on said frame, a driving-wheel on said shaft adapted to peripherally engage a running wheel, a guard or shield carried by said frame and protecting the driving-wheel, and a mud-scraper carried by said guard and adapted to engage the periphery of the running wheel, substantially as set forth.

17. In an automobile vehicle, the combination of a driving-wheel peripherally engaging the periphery of a running wheel to transmit motion thereto, and a scraper adapted to engage each point of the periphery of the running wheel after it leaves the ground and before it engages the driving-wheel, whereby a clean contact-surface is secured, substantially as set forth.

18. In an automobile vehicle, the combination with front and rear axles having running wheels, of transversely-slidable frames arranged one in front of the front axle and one behind the rear axle, driving-shafts and driving-wheels upon said sliding frames for transmitting motion to the running wheels, and means for simultaneously sliding said frames to steer the vehicle, substantially as set forth.

In testimony that I claim the foregoing I have hereunto set my hand this 7th day of March, 1900.

WALDO W. VALENTINE.

Witnesses:
CHARLES H. PELL,
C. B. PITNEY.